Aug. 13, 1940.  A. KOSIAN  2,211,234

HYDRAULIC CLUTCH AND POWER TRANSMISSION

Filed Aug. 7, 1937  2 Sheets-Sheet 1

ARTHUR KOSIAN
INVENTOR

PER

ATTORNEY

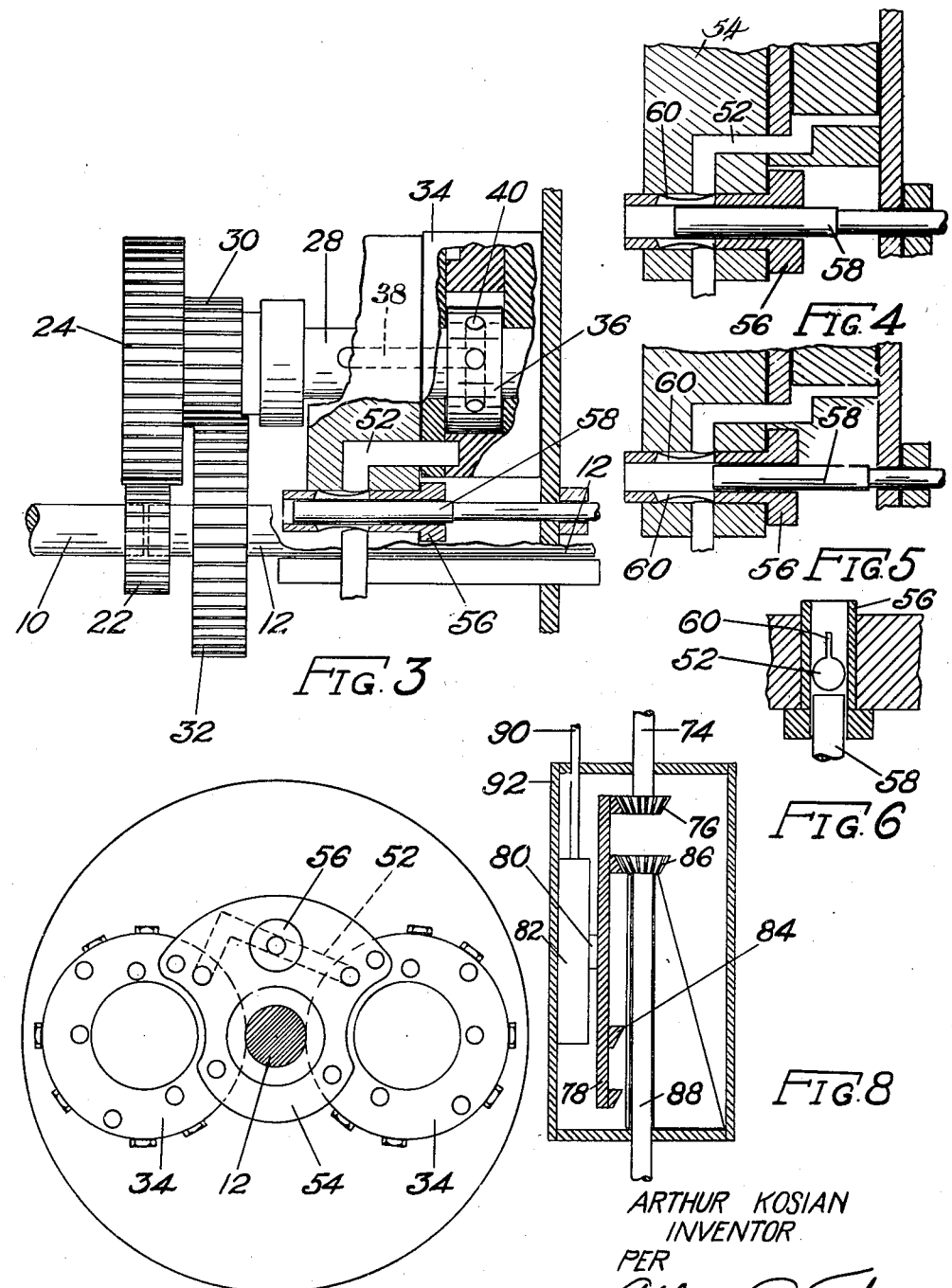

Patented Aug. 13, 1940

2,211,234

UNITED STATES PATENT OFFICE 2,211,234

HYDRAULIC CLUTCH AND POWER TRANSMISSION

Arthur Kosian, Chicago, Ill.

Application August 7, 1937, Serial No. 157,889

2 Claims. (Cl. 74—294)

This invention relates to an improved hydraulic clutch and power transmission, and has, for one of its principal objects, the provision of a mechanism wherein power can be transmitted from a driving shaft to a driven shaft through practically any variable speed ratio which can be readily controlled at the will of the operator.

One of the important objects of this invention is the provision of a power transmission mechanism combined with a hydraulic clutch and which can be readily and economically used in a great number of mechanical installations and for various operations wherever a variable speed transmission of power is required, as, for example, in an automobile drive.

Another important object of the invention is the provision in a hydraulic clutch and power transmission of a plurality of gears connected to the driving element and which, in turn, operate the driven element through a fluid pump, the pump, in turn, being controlled by a valve which governs the amount of fluid passing through the pump and consequently the speed ratio between the driving and driven shafts.

A further important object of the invention is the provision of a novel means for controlling the rate of fluid through a pump, which means incidentally comprises the regulating mechanism for the power transmission means itself.

Another and still further important object of the invention resides in the provision of a novel, yet simple, but powerful rotary pump which can be incorporated into a hydraulic clutch and power transmission mechanism of this type and whereby a satisfactorily operating structure will result.

Other and further important objects of the invention will be apparent from the disclosures in the accompanying drawings and following specification.

The invention, in a preferred form, is shown in the drawings and hereinafter more fully described.

In the drawings:

Figure 3 is a detail view, partly in section and parts being broken away, of the improved device of this invention, illustrating the principle of operation of the same.

Figure 4 is a detail view of a portion of the pump mechanism and the control valve for same, showing the valve in slightly open position as contrasted with the closed position illustrated in Figure 3.

Figure 5 is a detail view of the structure shown in Figure 4 but showing the valve in completely open position.

Figure 6 is a detail view of the valve structure, parts being in horizontal section.

Figure 7 is an end view of the apparatus with the gears removed, showing a pair of rotary pumps incorporated into the structure.

Figure 8 illustrates a slight modification of the invention.

As shown in the drawings:

Figure 1:
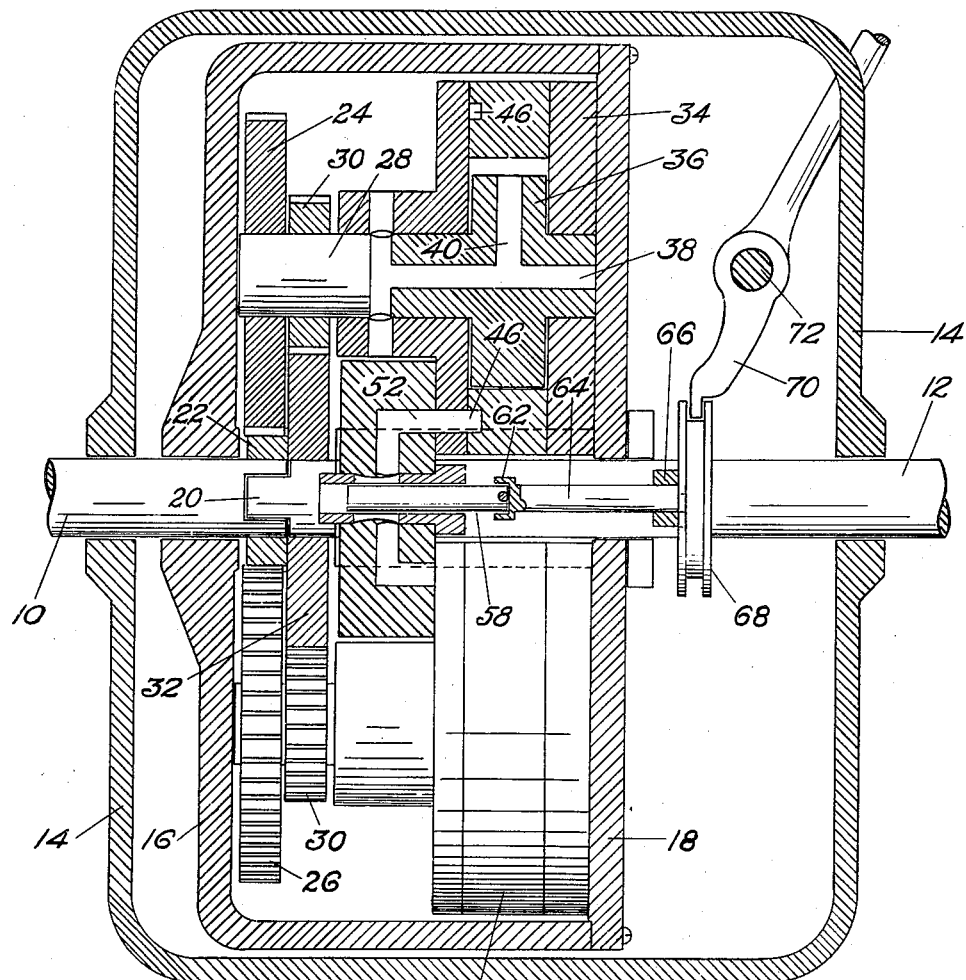
Figure 1 is a side elevation, partly in section, of the improved hydraulic clutch and power transmission mechanism of this invention.

The reference numeral 10 indicates generally the driving shaft of the improved hydraulic clutch and power transmission of this invention, and the reference numeral 12 indicates the driven shaft.

These shafts enter a housing 14 from opposed faces thereof and are mounted in suitable bearings, the housing itself being relatively fixed as in the case of an automobile transmission or clutch housing.

Inside this housing 14 is a second housing or container composed of a forward shell element 16 and a rearward cover element 18, each of these elements being provided with suitable bearings for the reception of the ends of the shafts 10 and 12 which extend into the housing 16—18 in abutting relationship. In fact, the end 20 of the shaft 12 extends into a corresponding recess in the opposed end of the shaft 10 and rotates freely therein.

This end of the shaft 10 is provided with a gear 22, which gear, in turn, meshes with a pair of larger gears 24 and 26 above and below it respectively. Each of these gears is mounted on a stub shaft 28, each of the shafts, in turn, carrying a further gear 30 also keyed thereon, both of which are in mesh with an intermediate gear 32. This intermediate gear is keyed onto the end of the shaft 12 as best shown in Figures 1 and 3.

Figure 2:
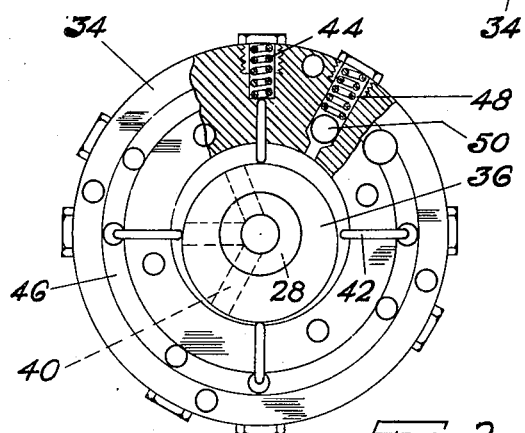
Figure 2 is a detail sectional view of the rotary pump used in conjunction with the clutch and transmission, parts of the pump being broken away to better show certain interior structural details.

The stub shafts 28 each project into a pump housing 34 and terminate in an eccentric rotor 36 which rotates in the pump housing (see Figure 2).

An inlet channel for oil or some other suitable fluid is provided at 38, this inlet channel passing into and running centrally of the stub shafts 28 and terminating in a plurality of branches as best shown by the dotted lines 40 in Figures 2 and 3.

The construction of these pumps, particularly the mounting of the inlet channel for fluid in the shaft is in accordance with my prior application for patent on Oil pump, Serial No. 37,790, filed August 26, 1935. However, the actual pump operation is somewhat different in that a plurality of vanes 42 is provided in the pump casing extending into and contacting the rotor 36, these vanes being spring-pressed as illustrated at 44.

A channel 46 extends peripherally around the outer casing of each pump 34 and communicates with the fittings for the vanes 42 and also communicates with all of the outlets 48, each outlet being provided with a ball valve or the like 50. The number of outlet valves corresponds to the number of vane structures, and it will be evident that pressure built up in the peripheral channel 46 will act on the end edges of the vanes, thereby supplementing the action of the springs 44 and providing a better operating contact of the inner rounded ends of the vanes with the rotor 36.

Liquid drawn in through channels 38—40 will be expelled through the outlet valves 48—50 into the peripheral groove 46 as the eccentric rotor 36 rotates, and from the groove 46, this liquid then passes from each pump into a channel 52 which is formed in an element 54 mounted between the two pumps 34 as best shown in Figure 7.

A bushing 56 is fitted into this element 54 and slidably mounted in this bushing is a rod 58 which acts as a control valve element to regulate the amount of liquid forced by the pumps through the channels 52.

The end of the rod 58 fits into the bushing 56 in such a manner that when it is in the position shown in Figure 3, no oil or other liquid will be allowed to flow through the pumps, thereby constraining the gears 30—32 against relative movement so far as the gears 22 and 24 are concerned, and accordingly, rotating the entire shell structure 16—18 inside the housing or casing 14 and forming a direct drive between the shafts 10 and 12.

However, when the shaft 58 is withdrawn into the position shown in Figure 4, some of the liquid in the pumps is allowed to escape through the channels 52 and through opposed slots 60 formed in the bushing 56, all as best shown in Figures 3 to 6 inclusive. This allows a very slow relative rotation of the rotors 36 in the pump casings 34 and a corresponding relative movement of the gears 22, 24, 30 and 32, whereby a relative difference of speed of rotation of the shafts 10 and 12 will result.

When the rod 58 is completely withdrawn as shown in Figure 5, the pumps are allowed to operate very freely, and there will consequently be no driving action exerted on the shaft 12.

It will be evident that control of the amount of liquid passing through the pumps will correspondingly control the amount of relative rotation of the driving and the driven shafts, and accordingly, a very large number of speed ratios may be very effectively obtained simply by a slight shift in the position of the rod 58.

This rod is joined by a coupling 62 to a further rod 64 which terminates in a fitting 66 attached to a grooved ring 68 slidably mounted on the shaft 12, and a control finger element 70 pivoted at 72 in the housing 14 operates in this grooved wheel 68, whereby the operating position of the end of the valve rod 58 can be accurately controlled from a point outside of the casing 14.

The casing 14 is fixed while the inner casing or shell 16—18 is rotatable therein, the rotation of this shell 16—18 depending upon the position of the control valve element 58 and the relative speed of the driving and driven shafts 10 and 12 respectively.

At Figure 8 is illustrated a modified form of the invention wherein a driving shaft 74 has a beveled gear 76 on its end, and this cooperates, in turn, with a correspondingly beveled gear 78 which is mounted on a shaft 80 driving a pump 82, and also on this shaft 80 is an internal gear 84 in mesh with a beveled gear 86 on a driven shaft 88. A control rod 90 for the pump 82 passes into the housing 92 which incloses the entire structure, the housing, in turn, being mounted in an outer casing similar to the casing 14 of Figure 1.

In the event that the device is to be used in a place where a fairly constant temperature obtains, the casing 16—18 may be practically completely filled with oil which can be very readily handled by the pumps 34, or obviously some other fluid may be substituted whenever the apparatus is liable to be subject to extreme variations in temperature such as, for example, in an automobile transmission.

The structure can be effectively operated by a single pump, but two or even more pumps may be employed whenever desirable or necessary, and it will further be obvious that pumps of various types and designs may be used.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A hydraulic clutch and power transmission, including a driving shaft, a driven shaft, the shafts being in alignment and having their ends abutting, a gear on the inner end of the driving shaft, a gear on the adjacent end of the driven shaft, a casing surrounding said gears, intermediate gears between the two first-named gears, said gears mounted on stub shafts fixed in the casing, pumps on the stub shafts, each of the pumps comprising a rotor eccentrically mounted in a casing, the casing mounted inside a housing inclosing the gears, inlet and outlet means for the pumps, a fluid in the casing, control means for regulating the amount of fluid passing through the pumps, said control means including a push-rod, the end of the rod terminating in a fluid conduit leading from the pumps, and means exterior of the casing for controlling the position of the push-rod, together with slots in the conduit for instigating a gradual operation of the pumps.

2. A hydraulic clutch and power transmission, including a driving shaft, a driven shaft, the shafts being in alignment and having their ends abutting, a gear on the inner end of the driving shaft, a gear on the adjacent end of the driven shaft, a casing surrounding said gears, intermediate gears between the two first-named gears, said gears mounted on stub shafts fixed in the casing, pumps on the stub shafts, each of the pumps comprising a rotor eccentrically mounted in a casing, the casing mounted inside a housing inclosing the gears, inlet and outlet means for the pumps, a fluid in the casing, and control means for regulating the amount of fluid passing through the pumps, said control means including a push-rod, the end of the rod terminating in a fluid conduit leading from the pumps, and means exterior of the casing for controlling the position of the push-rod, together with slots in the conduit for instigating a gradual operation of the pumps, said slots being adjacent the operating end of the push-rod.

ARTHUR KOSIAN.